No. 781,374. PATENTED JAN. 31, 1905.
H. D. SMITH.
POWER APPARATUS FOR BALING PRESSES.
APPLICATION FILED MAR. 26, 1904.
3 SHEETS—SHEET 2.
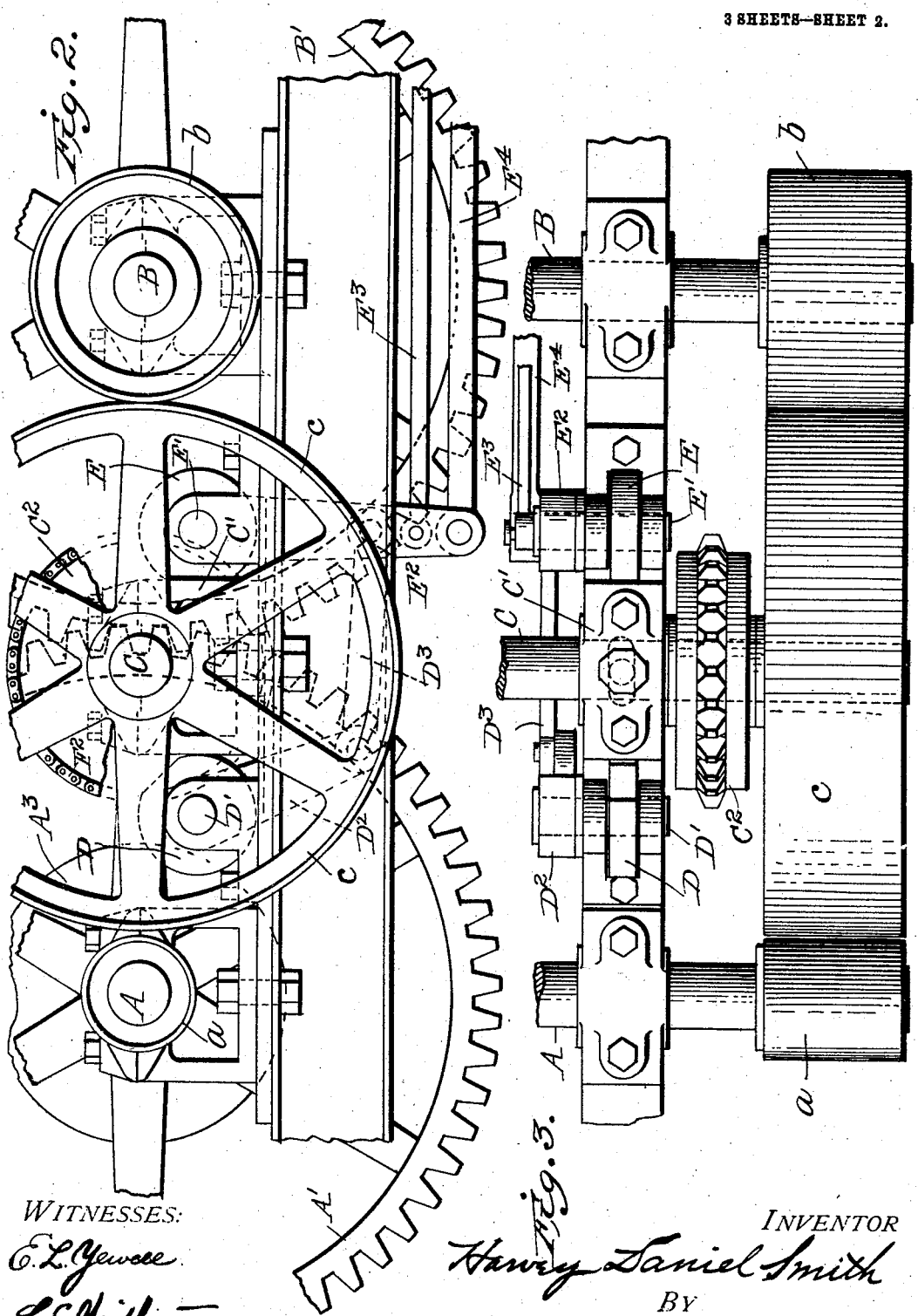
WITNESSES:
INVENTOR
Harvey Daniel Smith
By
Alexander & Powell
Attorneys No. 781,374. PATENTED JAN. 31, 1905.
H. D. SMITH.
POWER APPARATUS FOR BALING PRESSES.
APPLICATION FILED MAR. 26, 1904.
3 SHEETS—SHEET 3.
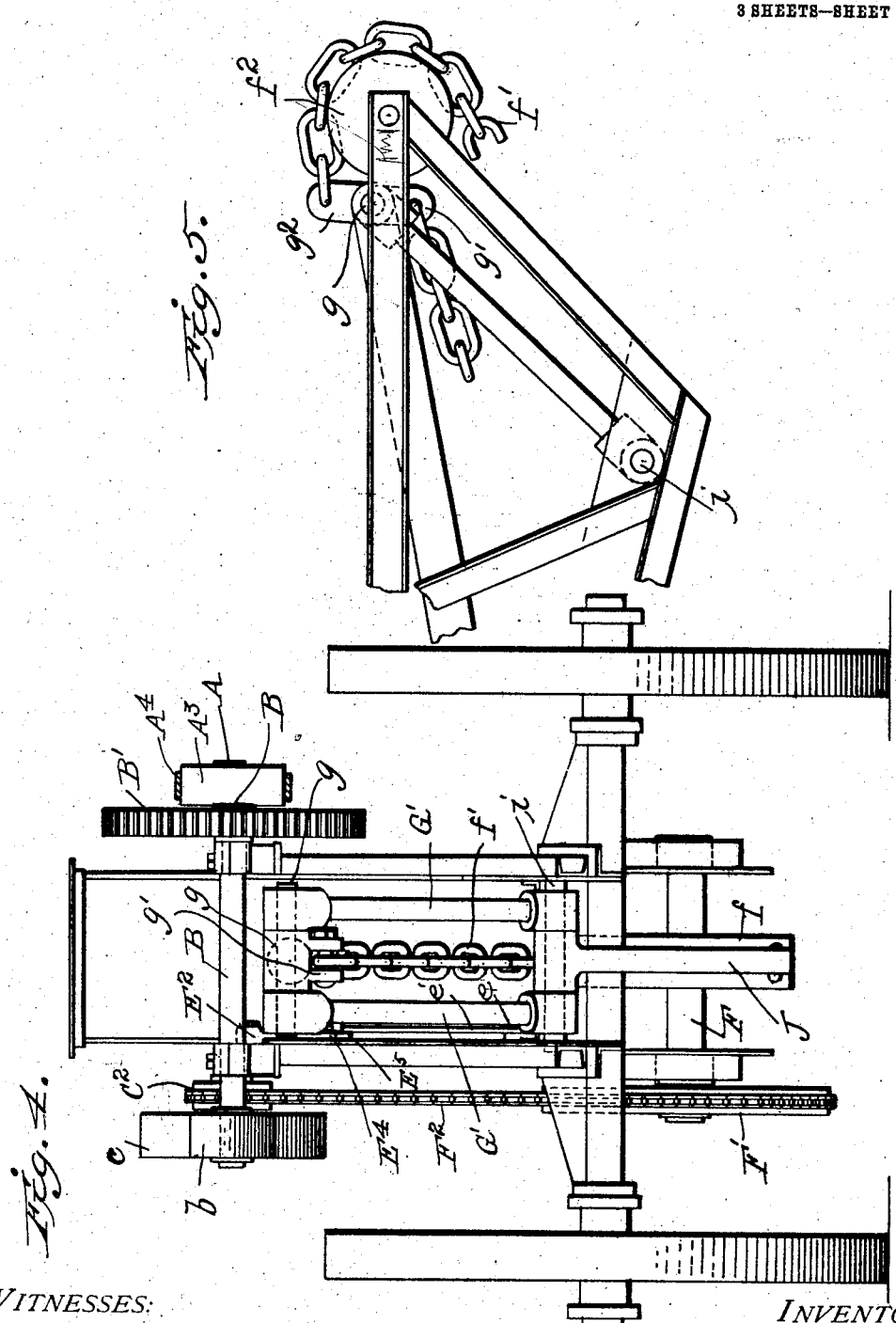
WITNESSES:
E. L. Yewell
L. E. Witham
INVENTOR
Harvey Daniel Smith
BY
Alexander & Towell
Attorneys.

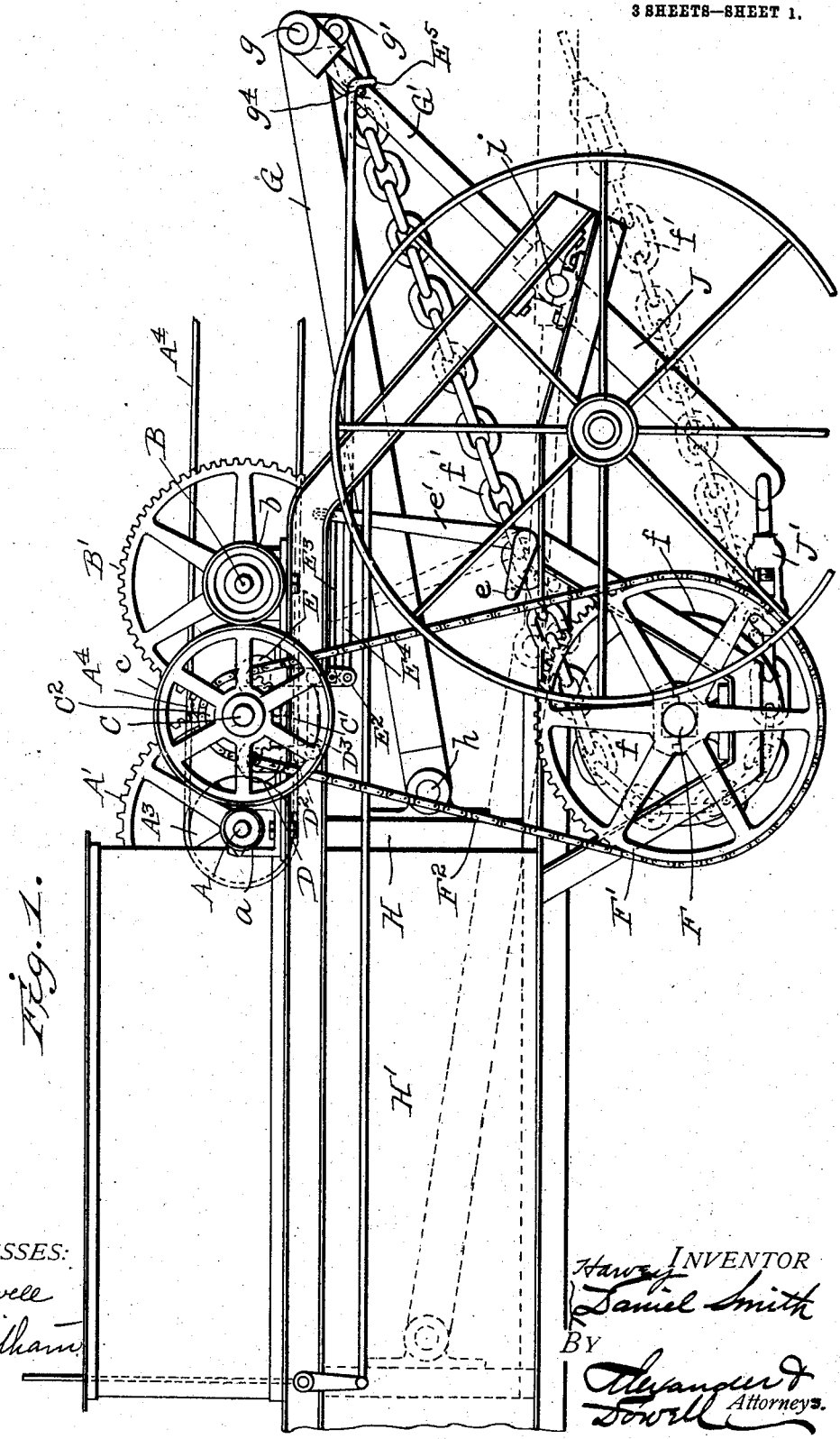

No. 781,374. Patented January 31, 1905.

UNITED STATES PATENT OFFICE.

HARVEY DANIEL SMITH, OF BATTLECREEK, MICHIGAN, ASSIGNOR, BY MESNE ASSIGNMENTS, TO HULSCHER AND MULFORD, OF BATTLE-CREEK, MICHIGAN, A COPARTNERSHIP.

POWER APPARATUS FOR BALING-PRESSES.

SPECIFICATION forming part of Letters Patent No. 781,374, dated January 31, 1905.

Application filed March 26, 1904. Serial No. 200,187.

*To all whom it may concern:*

Be it known that I, HARVEY DANIEL SMITH, of Battlecreek, in the county of Calhoun and State of Michigan, have invented certain new and useful Improvements in Power Apparatus for Baling-Presses; and I hereby declare that the following is a full, clear, and exact description thereof, reference being had to the accompanying drawings, which form part of this specification.

This invention is an improved power apparatus especially designed for use in connection with baling-presses, its object being to produce a powerful compression mechanism operated by belt-power; and it consists in novel mechanism whereby the compression mechanism (preferably a toggle) may be operated from a continuously-driven shaft and may be automatically caused to move the plunger in and out in proper times.

The invention will be clearly understood from the following description, in connection with the drawings, and I refer to the claims for summaries of the features and combinations of parts for which protection is desired.

In the drawings, Figure 1 is a side elevation of part of a baling-press, showing my improved power mechanism applied thereto. Fig. 2 is an enlarged view of the friction drive mechanism. Fig. 3 is a top view of Fig. 2. Fig. 4 is an end elevation of Fig. 1. Fig. 5 is a detail view showing a modified arrangement for returning the plunger.

In the drawings, A and B are two parallel shafts suitably journaled upon the framework of the machine adjacent to the baling-chamber. These shafts are preferably intergeared by pinions $A'$ $B'$, so as to rotate in opposite directions, and may be continuously driven from any suitable motor by a belt $A^4$, engaging a pulley $A^3$ on shaft A. Intermediate the shafts A B and parallel therewith is a shaft C, journaled in suitable bearings on the main frame, the bearing $C'$ thereof farthest removed from gears $A'$ $B'$ being secured to the frame by bolts and slots, so that it is capable of a slight lateral movement, sufficient to bring the periphery of a large gear or friction-disk or wheel $c$ into contact with one or the other of two gears or friction-disks $a$ and $b$, respectively, secured on the shafts A B. For the purpose of shifting shaft C to move and hold disk $c$ in contact with disk $a$ or $b$ rocking cams D E are provided, located on the opposite sides of the box $C'$ and mounted on short rock-shafts $D'$ $E'$, journaled in suitable boxes fixed to the main frame, the rock-shafts $D'$ $E'$ being provided with downwardly-extending levers $D^2$ $E^2$, which are pivotally connected by a link $D^3$, so that the levers may be simultaneously operated to shift cams D E simultaneously, and thus move box $C'$ right or left, one cam releasing as the other pushes, and the cams are so constructed as to firmly hold the box and shaft C in either adjusted position with disk $c$, contacting with disk $a$ or $b$, as desired. The levers are operated by means of the rods $E^3$ $E^4$, connected to lever $E^2$ and actuated at the proper times, as hereinafter described.

On shaft C is keyed a sprocket-gear $C^2$, from which motion is transmitted through sprocket-chain $F^2$ to a large sprocket-gear $F'$ on a shaft F, journaled in suitable bearings on the main frame, as in Fig. 1, the sprockets $F'$ being preferably fitted to a squared end of shaft F, as this gives greater strength than a key. On shaft F is likewise secured a large chain-gear wheel $f$, which actuates the draft-chain $f'$, by which the toggle operating the plunger in the baling-chamber is actuated. The chain $f'$ is connected to a link or eye $g'$ at the elbow or knuckle $g$ of the toggle, said toggle comprising the long member G and short member (or members) $G'$, members G $G'$ being pivotally connected together at the knuckle $g$. Member G extends inward and is pivotally connected at $h$ to a plunger H, which works in the feed-chamber $H'$, while the shorter member $G'$ is pivoted on the main frame at $i$ in advance of the shaft F and below the plane of the pivot $h$. When the shaft F is rotated so as to pull the upper run of the chain inward, it draws pivot $g'$ toward shaft F, extending the toggle, and consequently forcing the plunger H inward, compressing the material in the feed-box and forcing it into the baling-chamber. (Not shown.) Preferably the disk or gear $c$ is at this time operated by the smaller gear or disk $a$ on shaft A, so as to transmit power in most direct manner from the prime motor. As the toggle extends it moves the plunger more and more slowly, naturally; but greater power is exerted thereby, and any desired pressure can be given by properly adjusting the pressure of the frictional contact between disks $a$ $c$ when friction-gears are used. Furthermore, as the plunger reaches its inward limit of movement the knuckle $g$ of the toggle comes into line with the pivots $h$ $i$ and will drop slightly below such line, as shown in dotted lines, Fig. 1, thus positively locking the plunger in its inward position until the shaft F is reversed so as to retract the plunger.

I have shown two means or ways for retracting the plunger by contracting the toggle. In Fig. 1 a lever J is attached to the pivot $i$ of the toggle member G' in line with said member, and the outer end of said lever is attached to the other end of chain $f'$, preferably by an adjustable swivel-link J'. Thus as the toggle-lever is extended lever J takes up the chain $f'$ as it is paid out from chain-gear $f$, and when the motion of shaft F is reversed (which is accomplished by shifting disk $c$ into contact with disk $b$) chain-gear $f$ pulls lever J back to the position shown in full lines, Fig. 1, and thus contracts the toggle and retracts the plunger H. In Fig. 5 the lever J is dispensed with, and a chain-pulley $f^2$ is mounted on a bracket attached to the main frame just outside of the outermost position of knuckle $g$ of the toggle-lever, when the plunger is retracted and the chain $f'$ is extended from the knuckle-eye $g'$ to and around chain-gear $f$, back to and around chain-pulley $f^2$ and attached to an eye $g^2$ on the knuckle $g$. In this case the toggle is extended, as above described, and is contracted so as to retract the plunger by simply pulling chain $f'$ backward over pulley $f^2$.

The cam-operating levers $D^2$ $E^2$ may be operated by hand, but I have indicated in the drawings means for automatically shifting them, and for this purpose a rod $E^4$ is pivotally connected to the lever $E^2$ and extends forward to a point adjacent to the knuckle $g$ when the toggle is in its retracted position and has a hooked end $E^5$, adapted to be engaged by a pin or lug $g^4$ on member G' when the toggle is contracted and plunger H fully retracted, so that the rod $E^4$ will be pulled outward, thereby rocking cams D E and throwing disk $c$ into contact with disk $a$, reversing the direction of rotation of shaft F and starting the plunger inward. When the plunger has completed its inward stroke and its knuckle moves past the line between pivots $h$ $i$, the member G' engages the short arm $e$ of a bell-crank lever $ee'$, pivoted on the frame, and rocks the latter, and as the longer arm $e'$ of said lever is connected by a rod or link $E^3$ to lever $E^2$ the cams D E are shifted so as to move disk $c$ into engagement with disk $b$, resulting in reversing the motion of shaft F and thereby causing the retraction of the plunger.

The operation of the power will be clearly understood from the foregoing description and the drawings, and I do not desire to restrict myself to the particular forms or dimensions of parts indicated in the drawings, as changes may be made therein differentiating the appearance of the structure while retaining the essential features and advantages of the invention.

What I therefore claim, and desire to secure by Letters Patent, is—

1. In combination, a driving-shaft, a gear thereon, a laterally-adjustable shaft beside the same and driven thereby, a gear on the driven shaft adapted to be moved into or out of contact with the gear on the first shaft, a chain-gear means for driving the chain-gear on the laterally-adjustable shaft, a toggle-lever, and a chain for operating said lever actuated by said chain-gear, substantially as described.

2. In combination, a driving-shaft, a friction-disk thereon, a laterally-adjustable shaft beside the same and driven thereby, a friction-disk on the driven shaft adapted to be moved into or out of contact with the friction-disk on the first shaft, a compressing mechanism, and a sprocket-chain and gearing for driving the mechanism from the laterally-adjustable shaft.

3. In combination, a pair of parallel oppositely-rotating shafts, gears thereon, an intermediate laterally-movable shaft, a gear thereon, and means for shifting said intermediate shaft to throw its gear into contact with the gear of one of the adjacent shafts; with a plunger-operating mechanism and means for actuating said plunger-operating mechanism from said intermediate shaft, substantially as described.

4. In combination, a pair of parallel intergeared shafts, friction-disks thereon, an intermediate laterally-movable shaft, a friction-disk thereon, and means for shifting said intermediate shaft laterally to throw its disk into contact with the disk of one of the adjacent shafts; with a plunger-operating mechanism and means for actuating said mechanism from said intermediate shaft.

5. In combination, a pair of parallel oppositely-rotating shafts, gears thereon, an intermediate laterally-movable shaft, a gear thereon, and means for shifting said intermediate shaft to throw its gear into contact with the gear of one of the adjacent shafts; with a toggle, a chain and chain-gear for actuating said toggle, and means for driving the chain-gear from said intermediate shaft.

6. In combination, a pair of parallel inter-geared shafts, friction-disks thereon, an intermediate laterally-movable shaft, a friction-disk thereon, and means for shifting said intermediate shaft laterally to throw its disk into contact with the disk of one of the adjacent shafts; with a toggle, a chain and chain-gear for actuating said toggle, and means for driving the chain-gear from said intermediate shaft.

7. In combination, a pair of parallel shafts, means for driving said shafts in opposite directions, gears on said shafts, an intermediate laterally-adjustable shaft, a gear thereon, and cam devices for moving the latter shaft so as to bring its gear into mesh or contact with a gear on one of the adjacent shafts; with a plunger, a shaft and connections for operating said plunger, and means for driving said shaft from the laterally-movable shaft.

8. In combination, a pair of parallel inter-geared shafts, means for driving said shafts in opposite directions, friction-disks on said shafts, an intermediate laterally-adjustable shaft, a friction-disk thereon, and opposite cams for moving said shaft laterally so as to bring its disk into mesh or contact with the disk on one of the adjacent shafts; with a plunger, a shaft and connections for operating said plunger, and means for driving said shaft from the laterally-movable shaft.

9. In combination, a pair of parallel shafts, means for driving said shafts in opposite directions, gears on said shafts, an intermediate laterally-adjustable shaft, a gear thereon, and cam devices for moving the latter shaft so as to bring its gear into mesh or contact with a gear on one of the adjacent shafts; with a baling-chamber, a plunger, a toggle for operating said plunger, a chain-shaft, and chain for operating said toggle, and means for operating the chain-shaft from said intermediate shaft.

10. In combination, a pair of parallel inter-geared shafts, means for driving said shafts in opposite directions, disks on said shafts, an intermediate laterally-adjustable shaft, a friction-disk thereon, and opposite cams for moving said shaft laterally so as to bring its disk into mesh or contact with the disk on one of the adjacent shafts; with a baling-chamber, a plunger, a toggle for operating said plunger, a chain-shaft, chain-gear and chain for operating said toggle, and a sprocket-chain and gears for operating the chain-shaft from said intermediate shaft.

11. In combination, a pair of adjacent shafts, rotatable in opposite directions, gears on said shafts, an intermediate laterally-adjustable shaft, a gear thereon adapted to engage the gear on one of the adjacent shafts, and cams and connections for shifting the laterally-movable shaft; with a plunger, mechanism for reciprocating said plunger, means for actuating said mechanism from the laterally-movable shaft, and means controlled by the plunger-actuating mechanism for shifting said laterally-movable shaft.

12. In combination, a pair of adjacent inter-geared shafts, friction-disks on said shafts, an intermediate laterally-adjustable shaft, a friction-disk thereon adapted to engage the disk on one of the adjacent shafts, and cams and connections for shifting the laterally-movable shaft; with a plunger, a shaft and mechanism for operating said plunger, a sprocket-chain and gears, for actuating said shaft from the laterally-movable shaft, and means controlled by the plunger-actuating mechanism for shifting said laterally-movable shaft.

13. In combination, a driven shaft, a friction-disk on said shaft, an adjacent laterally-adjustable shaft, a disk thereon adapted to engage the disk on the first shaft, and means for shifting the laterally-movable shaft, a plunger, a toggle for actuating the plunger, a chain and chain-gear for actuating the toggle, and means for driving the chain-gear from the laterally-movable shaft.

14. In combination, a driven shaft, a friction-disk on said shaft, an adjacent laterally-adjustable shaft, a disk thereon adapted to engage the disk on the first shaft, and means for shifting the laterally-movable shaft, a plunger, a toggle for actuating the plunger, a chain and chain-gear for actuating the toggle and means for driving the chain-gear from the laterally-movable shaft; with means adapted to be operated when the toggle is contracted to shift the laterally-movable shaft in one direction, and means adapted to be operated when the toggle is expanded to shift the laterally-movable shaft in the opposite direction, substantially as described.

15. In combination, a pair of adjacent shafts, rotatable in opposite directions, gears or friction-disks on said shaft, an intermediate laterally-adjustable shaft, a gear or disk thereon adapted to engage the gear on one of the adjacent shafts, cams for shifting the laterally-movable shaft, a plunger, a toggle for actuating the plunger, a chain and chain-gear for actuating the toggle, and a sprocket-chain and gears for driving the chain-gear from the laterally-movable shaft.

16. In combination, a pair of adjacent shafts, rotatable in opposite directions, gears or friction-disks on said shaft, an intermediate laterally-adjustable shaft, a gear or disk thereon adapted to engage the gear on one of the adjacent shafts, cams for shifting the laterally-movable shaft, a plunger, a toggle for actuating the plunger, a chain and chain-gear for actuating the toggle, and a sprocket-chain and gears for driving the chain-gear from the laterally-movable shaft; with a rod adapted to be operated by the chain when the toggle is contracted to shift the laterally-movable shaft in one direction and a lever and connections adapted to be operated by the chain when the toggle is expanded to shift the laterally-movable shaft in the opposite direction, all substantially as and for the purpose described.

In testimony that I claim the foregoing as my own I affix my signature in presence of two witnesses.

HARVEY DANIEL SMITH.

In presence of—
 WILLIAM J. MULFORD,
 H. F. WINGATE.